(12) United States Patent
Moniz et al.

(10) Patent No.: US 7,334,981 B2
(45) Date of Patent: Feb. 26, 2008

(54) COUNTER-ROTATING GAS TURBINE ENGINE AND METHOD OF ASSEMBLING SAME

(75) Inventors: Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 10/976,590

(22) Filed: Oct. 29, 2004

(65) Prior Publication Data

US 2006/0093469 A1    May 4, 2006

(51) Int. Cl.
*F01D 1/26* (2006.01)
*F01K 3/072* (2006.01)

(52) U.S. Cl. ............ 415/65; 415/69; 415/134; 415/229; 416/128; 416/129; 416/174; 60/39.162; 29/889.2; 29/889.21

(58) Field of Classification Search ........... 415/65, 415/69, 134, 136, 138, 229; 416/122, 124–126, 416/128–129, 174; 60/39.162; 29/889.2, 29/889.21
See application file for complete search history.

(56) References Cited

U.S. PATENT DOCUMENTS

| | | | |
|---|---|---|---|
| 3,729,957 A | * | 5/1973 | Petrie et al. ............... 60/226.1 |
| 5,010,729 A | * | 4/1991 | Adamson et al. ........ 60/39.162 |
| 5,806,303 A | | 9/1998 | Johnson |
| 5,809,772 A | | 9/1998 | Giffin, III et al. |
| 5,813,214 A | | 9/1998 | Moniz et al. |
| 5,867,980 A | | 2/1999 | Bartos |
| 6,619,030 B1 | | 9/2003 | Seda et al. |
| 6,684,626 B1 | | 2/2004 | Orlando et al. |
| 6,711,887 B2 | | 3/2004 | Orlando et al. |
| 6,732,502 B2 | | 5/2004 | Seda et al. |
| 6,739,120 B2 | | 5/2004 | Moniz et al. |
| 6,763,652 B2 | | 7/2004 | Baughman et al. |
| 6,763,653 B2 | | 7/2004 | Orlando et al. |
| 6,763,654 B2 | | 7/2004 | Orlando et al. |
| 2006/0032210 A1 | * | 2/2006 | Giffin et al. ............. 60/36.162 |

* cited by examiner

*Primary Examiner*—Christopher Verdier
(74) *Attorney, Agent, or Firm*—William Scott Andes; Armstrong Teasdale LLP

(57) ABSTRACT

A method for assembling a gas turbine engine that includes providing a low-pressure turbine inner rotor that includes a first plurality of rows of turbine blades configured to rotate in a first rotational direction, providing a low-pressure turbine outer rotor that includes a second plurality of rows of turbine blades configured to rotate in a rotational direction that is opposite the first rotational direction, and coupling a support structure between the outer rotor and a turbine mid-frame such that the support structure supports a forward end of the outer rotor, and wherein the support structure includes a first portion that has a first coefficient of thermal expansion and a second portion that has a second coefficient of thermal expansion that is different than the first coefficient of thermal expansion.

20 Claims, 4 Drawing Sheets

COUNTER-ROTATING GAS TURBINE ENGINE AND METHOD OF ASSEMBLING SAME

BACKGROUND OF THE INVENTION

This invention relates generally to aircraft gas turbine engines, and more specifically to counter-rotating gas turbine engines.

At least one known gas turbine engine includes, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine. In operation, the core engine generates combustion gases which are discharged downstream to a counter-rotating low-pressure turbine that extracts energy therefrom for powering the forward and aft fan assemblies. Within at least some known gas turbine engines, at least one turbine rotates in an opposite direction than the other rotating components within the engine At least one known counter-rotating low-pressure turbine has an inlet radius that is larger than a radius of the high-pressure turbine discharge. The increase inlet radius accommodates additional stages within the low-pressure turbine. Specifically, at least one known counter-rotating low-pressure turbine includes an outer rotor having a first quantity of low-pressure stages that are rotatably coupled to the forward fan assembly, and an inner rotor having an equal number of stages that is rotatably coupled to the aft fan assembly.

During engine assembly, such known gas turbine engines are assembled such that the outer rotor is cantilevered from the turbine rear-frame. More specifically, the first quantity of stages of the outer rotor are each coupled together and to the rotating casing, and the outer rotor is then coupled to the turbine rear-frame using only the last stage of the outer rotor, such that only the last stage of the outer rotor supports the combined weight of the outer rotor rotating casing. Accordingly, to provide the necessary structural strength to such engines, the last stage of the outer rotor is generally much larger and heavier than the other stages of the outer rotor. As such, during operation, the performance penalties associated with the increased weight and size may actually negate the benefits of utilizing a counter-rotating low-pressure turbine.

BRIEF DESCRIPTION OF THE INVENTION

In one aspect, a method for assembling a gas turbine engine is provided. The method includes providing a low-pressure turbine inner rotor that includes a first plurality of rows of turbine blades configured to rotate in a first rotational direction, providing a low-pressure turbine outer rotor that includes a second plurality of rows of turbine blades configured to rotate in a rotational direction that is opposite the first rotational direction, and coupling a support structure between the outer rotor and a turbine mid-frame such that the support structure supports a forward end of the outer rotor, and wherein the support structure includes a first portion that has a first coefficient of thermal expansion and a second portion that has a second coefficient of thermal expansion that is different than the first coefficient of thermal expansion.

In another aspect, a low-pressure turbine is provided. The low-pressure turbine includes an inner rotor that includes a first plurality of rows of turbine blades configured to rotate in a first rotational direction, an outer rotor rotatably coupled to the inner rotor, wherein the outer rotor includes a second plurality of rows of turbine blades configured to rotate in a second rotational direction that is opposite the first rotational direction, and a support structure coupled between the outer rotor and a turbine mid-frame such that the support structure supports a forward end of the outer rotor. The support structure includes a first portion having a first coefficient of thermal expansion and a second portion having a second coefficient of thermal expansion that is different than the first coefficient of thermal expansion.

In a further aspect, a gas turbine engine is provided. The gas turbine engine includes an inner rotor including a first plurality of rows of turbine blades configured to rotate in a first rotational direction, an outer rotor including a second plurality of rows of turbine blades configured to rotate in a second rotational direction that is opposite the first rotational direction, wherein the outer rotor is coupled to the inner rotor such that at least one of the second plurality of rows of turbine blades is coupled axially forward of the first plurality of rows of turbine blades, and a support structure coupled between the outer rotor and a turbine mid-frame such that the support structure supports a forward end of the outer rotor. The support structure includes a first portion having a first coefficient of thermal expansion and a second portion having a second coefficient of thermal expansion that is different than the first coefficient of thermal expansion.

DETAILED DESCRIPTION OF THE INVENTION

Figure 1:
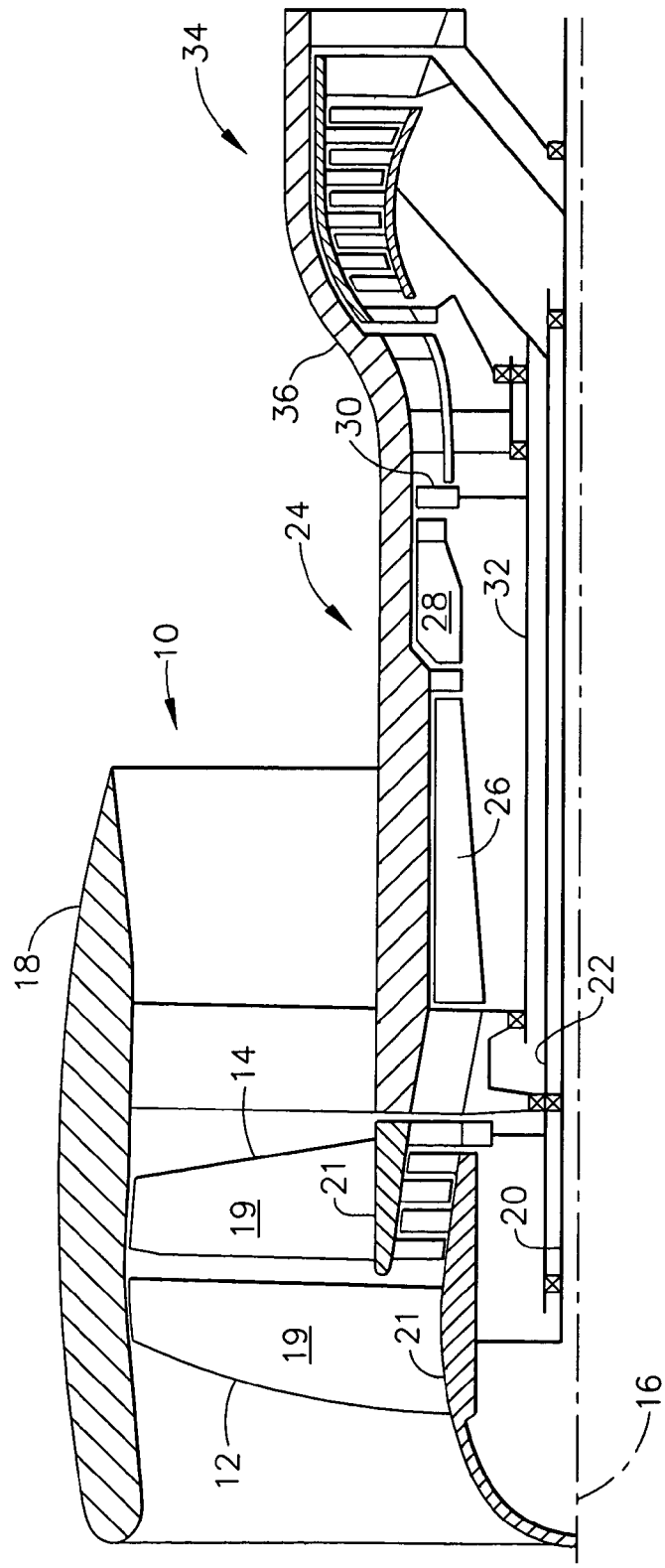
FIG. 1 is a cross-sectional view of a portion of an exemplary gas turbine engine.

FIG. 1 is a cross-sectional view of a portion of an exemplary gas turbine engine 10 that includes a forward fan assembly 12 and an aft fan assembly 14 disposed about a longitudinal centerline axis 16. The terms "forward fan" and "aft fan" are used herein to indicate that one of the fans 12 is coupled axially upstream from the other fan 14. In one embodiment, fan assemblies 12 and 14 are positioned at a forward end of gas turbine engine 10 as illustrated. In an alternative embodiment, fan assemblies 12 and 14 are positioned at an aft end of gas turbine engine 10. Fan assemblies 12 and 14 each include a plurality of rows of fan blades 19 positioned within a nacelle 18. Blades 19 are joined to respective rotor disks 21 that are rotatably coupled through a respective fan shaft 20 to forward fan assembly 12 and through a fan shaft 22 to aft fan assembly 14.

Gas turbine engine 10 also includes a core engine 24 that is downstream from fan assemblies 12 and 14. Core engine 24 includes a high-pressure compressor (HPC) 26, a combustor 28, and a high-pressure turbine (HPT) 30 that is coupled to HPC 26 via a core rotor or shaft 32. In operation, core engine 24 generates combustion gases that are channeled downstream to a counter-rotating low-pressure turbine 34 which extracts energy from the gases for powering fan assemblies 12 and 14 through their respective fan shafts 20 and 22.

Figure 2:
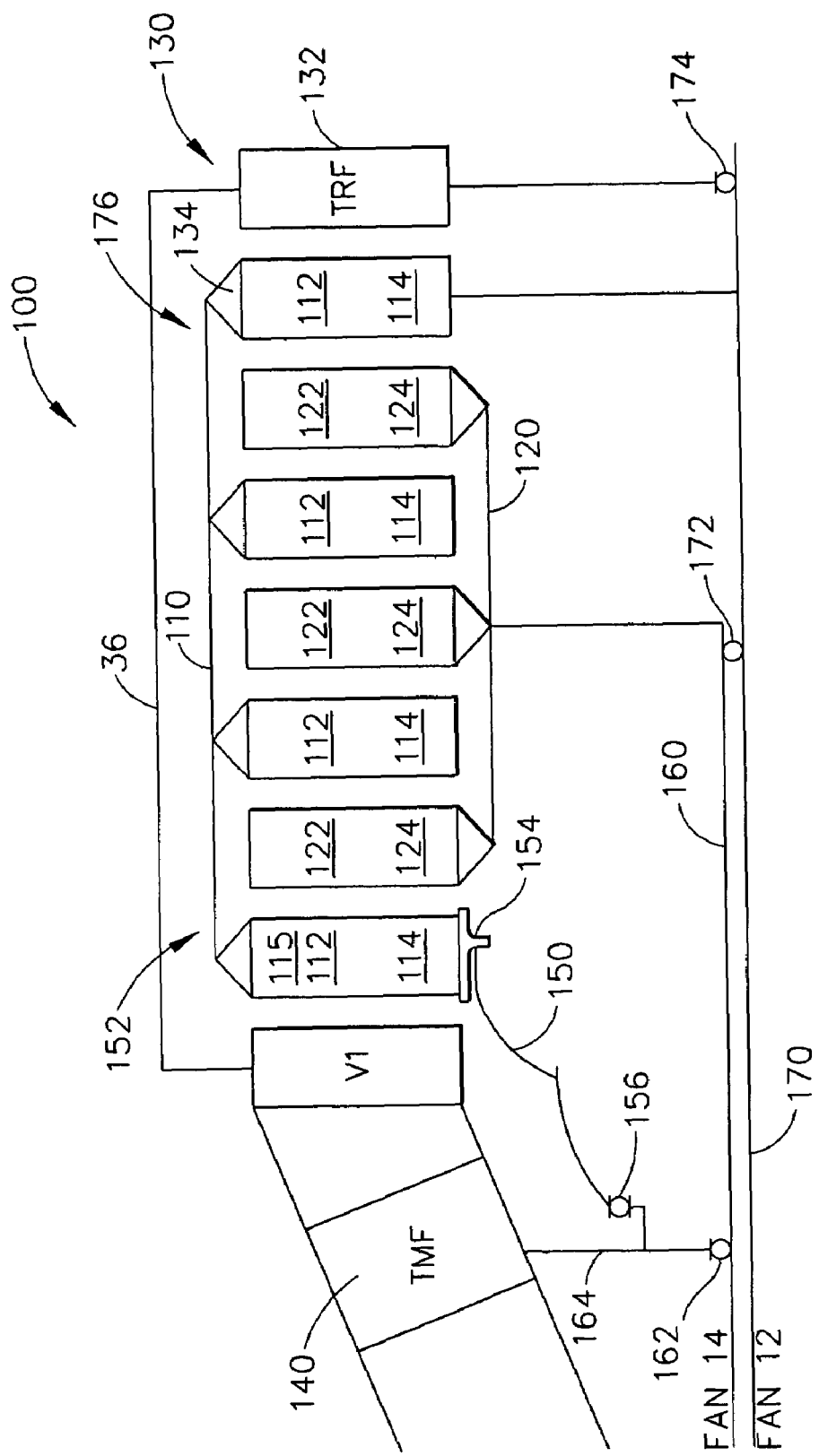
FIG. 2 is a schematic diagram of an exemplary counter-rotating low pressure turbine assembly that can be used with the gas turbine engine shown in FIG. 1.

FIG. 2 is a schematic diagram of an exemplary straddle-mounted counter-rotating low-pressure turbine assembly 100 that may be used with a gas turbine engine such as gas turbine engine 10 (shown in FIG. 1). In the exemplary embodiment, within low-pressure turbine assembly 100, stationary outer casing 36 is coupled to core engine 24 downstream from high-pressure turbine 30 (shown in FIG. 1). Low-pressure turbine 100 includes a radially outer rotor 110 that is positioned radially inwardly of outer casing 36. Outer rotor 110 has a generally frusto-conical shape and includes a plurality of circumferentially-spaced rotor blades 112 that extend radially inwardly. Blades 112 are arranged in axially-spaced blade rows 114. Although, the exemplary embodiment illustrates four rows 114, it should be realized that outer rotor 110 may have any quantity of rows 114 without affecting the scope of the method and apparatus described herein. More specifically, outer rotor 110 includes M rows 114 of blades 112.

Low-pressure turbine 100 also includes a radially inner rotor 120 that is aligned substantially coaxially with respect to, and radially inward of, outer rotor 110. Inner rotor 120 includes a plurality of circumferentially-spaced rotor blades 122 that extend radially outwardly and are arranged in axially-spaced rows 124. Although the exemplary embodiment illustrates three rows, it should be realized that inner rotor 120 may have any quantity of rows without affecting the scope of the method and apparatus described herein. More specifically, inner rotor 120 includes N rows 124 of blades 122. In the exemplary embodiment, M=N+1. Accordingly, and in the exemplary embodiment, outer rotor 110 includes an even number of rows 114 of blades 112 and inner rotor 120 includes an odd number of rows 124 of blades 122 such that outer rotor 110 surrounds and/or straddles inner rotor 120.

In the exemplary embodiment, inner rotor blades 122, extending from rows 124, are axially-interdigitated with outer rotor blades 112, extending from rows 114, such that inner rotor rows 124 extend between respective outer rotor rows 114. Blades 112 and 122 are therefore configured for counter-rotation of rotors 110 and 120.

In the exemplary embodiment, low-pressure turbine 100 also includes a rotor support assembly 130 that includes a stationary annular turbine rear-frame 132. Turbine rear-frame 132 is coupled aft of low-pressure turbine outer and inner turbine rotor 112 and 122, and a rotatable aft frame 134 is positioned aft of outer and inner rotor blades 112 and 122, and upstream from turbine rear-frame 132. Frame 134 is coupled to an aft end of outer rotor 110 for rotation therewith and to facilitate providing additional structural support to turbine blades 112. An annular turbine mid-frame 140 is positioned upstream from outer and inner rotor blades 112 and 122.

Low-pressure turbine 100 also includes a support structure 150 that is coupled to plurality of outer rotor blades 112 and to turbine mid-frame 140. More specifically, a first or axially forward row 115 of outer rotor blades 112 each include a platform 154 that extends radially inward from outer rotor blades 112. In the exemplary embodiment, support structure 150 is rotatably coupled to turbine mid-frame 140 using at least one bearing assembly 156. In one embodiment, support structure 150 includes a plurality of openings 158 to facilitate channeling air from an upstream side of support structure 150 to a downstream side of support structure 150. In another embodiment, support structure 150 does not include openings 158.

A first shaft 160 rotatably couples inner rotor 120 and fan 14. In the exemplary embodiment, first shaft 160 is positioned radially inward of support structure 150. A first shaft bearing 162 is coupled to shaft 160 such that the weight of inner rotor 120 is distributed approximately equally about the circumference of gas turbine engine 10 at forward end 152, via a structural member 164.

Low-pressure turbine 100 also includes a second shaft 170 that rotatably couples fan 12, outer rotor 110, and turbine rear-frame 132 together. More specifically, low-pressure turbine 100 includes a shaft differential bearing 172 that is coupled between first shaft 160 and second shaft 170, and a second bearing 174 coupled between second shaft 170 and turbine rear-frame 132. Specifically, shaft 170 extends between fan 12 and turbine rear-frame 132 such that the weight of outer rotor 110 at an aft end 176 is distributed approximately equally about the circumference of gas turbine engine 10 at aft end 176, via bearing 174 and turbine rear-frame 132.

Figure 3:
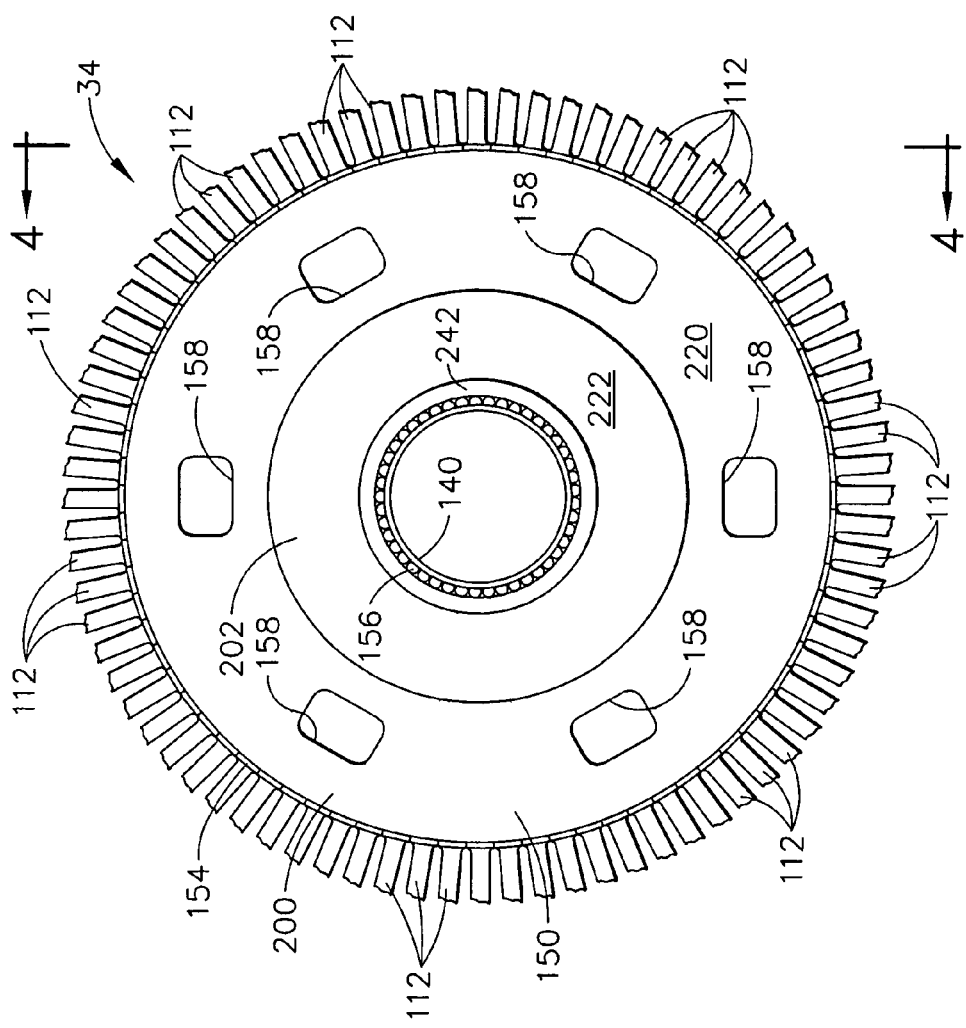
FIG. 3 is an end view of an exemplary support assembly that can be used with the counter-rotating low-pressure turbine shown in FIG. 2.
Figure 4:
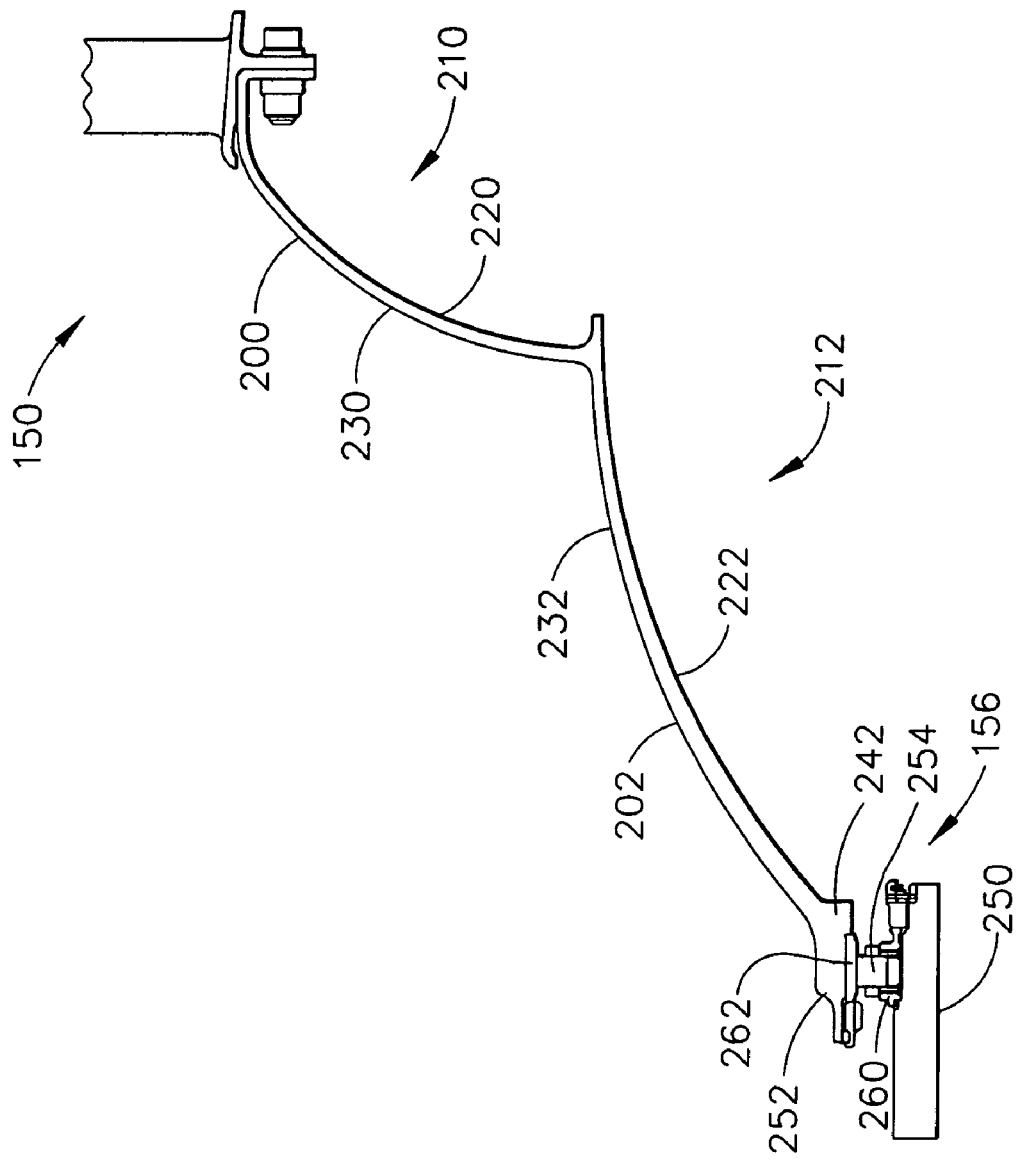
FIG. 4 is an expanded view of the support assembly shown in FIG. 3 taken along view 4—4.

FIG. 3 is a is an end view of support structure 150. FIG. 4 is a side view of support structure 150 shown in FIG. 3 taken along view 4—4. In the exemplary embodiment, support structure 150 is a rotating bimetallic housing that includes a first portion 200 and a second portion 202. In one embodiment, first and second portions 200 and 202 are fabricated to form a unitary support structure 150. In another embodiment, first and second portions 200 and 202 are coupled through a brazing and/or welding procedure for example.

First portion 200 has an arcuate or convex curvature 210 and second portion 202 has an arcuate or convex curvature 212. In the exemplary embodiment, curvature 210 is greater than curvature 212. More specifically, first portion 200 has an exterior surface 220 that is more convex or bowed than an exterior surface 222 of second portion 202.

First portion 200 is fabricated from a first material 230 and second portion 202 is fabricated from a second material 232 that is different than first material 230. More specifically, first portion 200 is fabricated from a material 230 that has a first coefficient of thermal expansion α1 and second portion 202 is fabricated from material 232 that has a second coefficient of thermal expansion α2. In the exemplary embodiment, the first coefficient of thermal expansion α1 is greater that the second coefficient of thermal expansion α2 to facilitate first portion 200 expanding at a thermal rate that is greater than a thermal rate of expansion of second portion 202. In the exemplary embodiment, first material 230 is a metallic material such as, but not limited to, Inconel 718, and second material 232 is a metallic material such as, but not limited to, IN909.

In the exemplary embodiment, gas turbine engine 10 includes a plurality of bearing assemblies 156 that facilitate providing structural support to outer rotor 110 via support structure 150 during maneuver loading. Bearing assemblies 156 are circumferentially-spaced about an inner portion 242 of support structure 150 to facilitate providing rotational support to support structure 150. More specifically, and in the exemplary embodiment, at least four bearing assemblies 156 are circumferentially-spaced approximately equidistantly about inner portion 242 of support structure 150 such that support structure 150 is rotatably coupled to turbine mid-frame 140. Although the exemplary embodiment describes only four support bearing assemblies 156, it should be realized that gas turbine engine 10 can include any quantity of bearing assemblies 156 to facilitate supporting outer rotor 110.

Each bearing assembly 156 includes a support member 250 that is fixedly secured to turbine mid-frame 140 and is rotatably coupled to bearing assembly 156 using at least one fastener (not shown). In one embodiment, each bearing assembly 156 includes a paired race 252, and at least one bearing element 254. Paired race 252 includes an outer race 262 and an inner race 260 that is radially inward from outer race 262. Bearing elements 254 extend between inner race 260 and outer race 262. In one embodiment, bearing assembly 156 is a foil bearing assembly that includes a plurality of metal foils (not shown) that extend between inner race 260 and outer race 262. In another embodiment, bearing assembly 156 is at least one of a roller bearing, a ball bearing, and/or a needle bearing. In the exemplary embodiment, bearing assemblies 156 facilitate reducing the affects of maneuver loads on counter-rotating low-pressure turbine 34 while also increasing clearance control and sealing between the rotors.

In the exemplary embodiment, during engine operation, radial forces generated during rotation of outer rotor 110 are transmitted to turbine mid-frame 140 via support structure 150. More, specifically, as outer rotor 110 rotates, radial forces from outer rotor 110 are transferred to support structure 150. Since support structure 150 includes a first portion having a first coefficient of expansion and a second portion having a second coefficient of expansion that is less than the first portion, first portion 200 bows or flexes more than second portion 202, thus support structure 150 functions as a biasing mechanism or spring between outer rotor 110 and turbine mid-frame 140. More specifically, since first portion 200 has a greater thermal coefficient of expansion that second portion 202, first portion 200 will expand more than second portion 202. Accordingly, a concavity of first portion 200 will increase in comparison to a concavity of second portion 202, thus permitting support structure 150 to flex and thereby absorb the radial forces generated by outer rotor 110. More specifically, as outer rotor 110 is forced radially outward during operation, because support structure 150 is attached to outer casing 36, via bearings 156, any radial movement of outer rotor 110 is transmitted to casing 36, such that outer rotor 110 is substantially maintained in a relatively constant radial position with respect to outer casing 36.

The exemplary embodiments described above illustrate a counter-rotating low-pressure turbine having an outer rotor that includes an even number of stages and an inner rotor that includes an odd number of stages such that the outer rotor straddles the inner rotor. Since, the outer rotor straddles the inner rotor, the outer rotor is configurable to couple to either the forward or aft fan assembly. Moreover, the support structure described herein facilitates distributing the weight of outer rotor 110 approximately equally between turbine mid-frame 140 and turbine rear-frame 132. Accordingly, the size of the turbine rear-frame can be reduced resulting in reduced production and assembly costs.

Exemplary embodiments of straddle-mounted counter-rotating low-pressure turbines including a wish-bone shaped bimetallic outer rotor support structure is described above in detail. The components are not limited to the specific embodiments described herein, but rather, components of each system may be utilized independently and separately from other components described herein. The support structure described herein can also be used in combination with other known gas turbine engines.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    providing a low-pressure turbine inner rotor that includes a first plurality of rows of turbine blades configured to rotate in a first rotational direction;
    providing a low-pressure turbine outer rotor that includes a second plurality of rows of turbine blades configured to rotate in a rotational direction that is opposite the first rotational direction; and
    coupling a support structure between the outer rotor and a turbine mid-frame such that the support structure supports a forward end of the outer rotor, and wherein the support structure includes a first portion that has a first coefficient of thermal expansion and a second portion that has a second coefficient of thermal expansion that is different than the first coefficient of thermal expansion.

2. A method in accordance with claim 1 further comprising coupling the outer rotor to the gas turbine engine such that at least one of the second plurality of rows of turbine blades is coupled axially forward of the first plurality of rows of turbine blades.

3. A method in accordance with claim 1 wherein the second coefficient of thermal expansion is greater than the first coefficient of thermal expansion.

4. A method in accordance with claim 1 further comprising coupling the support structure including the first portion fabricated from a metallic material and the second portion fabricated from a metallic material between the outer rotor and the turbine mid-frame, wherein the first portion and the second portion are fabricated from different metallic materials.

5. A method in accordance with claim 4 wherein the second coefficient of thermal expansion is greater than the first coefficient of thermal expansion.

6. A method in accordance with claim 1 further comprising coupling at least one bearing assembly to the support member such that the bearing assembly supports a forward end of the outer rotor.

7. A low-pressure turbine comprising:
    an inner rotor comprising a first plurality of rows of turbine blades configured to rotate in a first rotational direction;
    an outer rotor rotatably coupled to said inner rotor, said outer rotor comprising a second plurality of rows of turbine blades configured to rotate in a second rotational direction that is opposite the first rotational direction; and
    a support structure coupled between said outer rotor and a turbine mid-frame such that said support structure supports a forward end of said outer rotor, said support structure comprises a first portion having a first coefficient of thermal expansion and a second portion having a second coefficient of thermal expansion that is different than the first coefficient of thermal expansion.

8. A low-pressure turbine in accordance with claim 7 wherein at least one of said second plurality of rows of turbine blades is coupled axially forward of said first plurality of turbine blade rows.

9. A low-pressure turbine in accordance with claim 7 wherein the second coefficient of thermal expansion is greater than the first coefficient of thermal expansion.

10. A low-pressure turbine in accordance with claim 7 wherein said first portion is fabricated from a metallic material having a the first coefficient of thermal expansion, and said second portion is fabricated from a metallic material having the second coefficient of thermal expansion that is different than the first coefficient of thermal expansion.

11. A low-pressure turbine in accordance with claim 7 wherein said first portion is fabricated from a metallic material having the first coefficient of thermal expansion, and said second portion is fabricated from a metallic material having the second coefficient of thermal expansion that is greater than the first coefficient of thermal expansion.

12. A low-pressure turbine in accordance with claim 7 further comprising at least one bearing assembly coupled to said support member such that said bearing assembly supports a forward end of said outer rotor.

13. A low-pressure turbine in accordance with claim 7 wherein said first portion is coupled to said outer rotor and said second portion is coupled to a bearing assembly.

14. A low-pressure turbine in accordance with claim 7 wherein said first portion comprises a surface that has a radius of curvature and said second portion comprises a surface that has a radius of curvature that is less than the radius of curvature of the surface of the first portion.

15. A gas turbine engine comprising:
an inner rotor comprising a first plurality of rows of turbine blades configured to rotate in a first rotational direction;
an outer rotor comprising a second plurality of rows of turbine blades configured to rotate in a second rotational direction that is opposite the first rotational direction, said outer rotor is coupled to said inner rotor such that at least one of said second plurality of rows of turbine blades is coupled axially forward of said first plurality of rows of turbine blades; and
a support structure coupled between said outer rotor and a turbine mid-frame such that said support structure supports a forward end of said outer rotor, said support structure comprising a first portion that has a first coefficient of thermal expansion and a second portion that has a second coefficient of thermal expansion that is different than the first coefficient of thermal expansion.

16. A gas turbine engine in accordance with claim 15 wherein the second coefficient of thermal expansion is greater than the first coefficient of thermal expansion.

17. A gas turbine engine in accordance with claim 15 wherein said first portion is fabricated from a metallic material that has the first coefficient of thermal expansion, and said second portion is fabricated from a metallic material that has the second coefficient of thermal expansion that is different than the first coefficient of thermal expansion.

18. A gas turbine engine in accordance with claim 15 wherein said first portion is fabricated from a metallic material that has the first coefficient of thermal expansion, and said second portion is fabricated from a metallic material that has the second coefficient of thermal expansion that is greater than the first coefficient of thermal expansion.

19. A gas turbine engine in accordance with claim 15 further comprising at least one bearing assembly coupled between said support member and the turbine mid-frame such that said bearing assembly supports a forward end of said outer rotor.

20. A gas turbine engine in accordance with claim 15 wherein said first portion is coupled to said outer rotor and said second portion is coupled to a bearing assembly.

* * * * *